United States Patent [19]

Tveit et al.

[11] Patent Number: 5,104,473
[45] Date of Patent: Apr. 14, 1992

[54] APPARATUS AND METHOD FOR REMOVING A RELEASE SHEET FROM A WORKPIECE

[75] Inventors: Gary L. Tveit, Churchville; Terence J. Fitzgerald, Rochester; Edward L. Nageldinger, Stanley, all of N.Y.

[73] Assignee: Eastman Kodak Company, Rochester, N.Y.

[21] Appl. No.: 592,939

[22] Filed: Oct. 3, 1990

[51] Int. Cl.$^5$ .............................................. B32B 31/18
[52] U.S. Cl. .................................. 156/268; 156/344; 156/584
[58] Field of Search ............... 156/584, 247, 249, 268, 156/344; 430/256; 40/638

[56] References Cited

U.S. PATENT DOCUMENTS

| 2,303,346 | 12/1942 | Flood | 156/268 X |
| 2,855,707 | 8/1953 | Schor | 156/344 X |
| 3,451,872 | 6/1969 | Townsend | 156/584 X |
| 3,810,812 | 5/1974 | Koenig | 156/268 X |
| 3,818,592 | 6/1974 | Himeno | 156/584 X |
| 3,859,157 | 1/1975 | Morgan | 156/268 |
| 3,966,532 | 6/1976 | Harasta | 156/268 X |
| 4,183,751 | 1/1980 | Matsumoto et al. | 354/354 X |
| 4,508,589 | 4/1985 | Tarui et al. | 156/584 |
| 4,631,110 | 12/1986 | Tsumura et al. | 156/584 |
| 4,821,971 | 4/1989 | Watanabe et al. | 242/55 |
| 4,822,445 | 4/1989 | Yamaguchi | 156/510 |
| 4,867,836 | 9/1989 | Hamamura et al. | 156/584 |
| 4,880,488 | 11/1989 | Matsuo et al. | 156/344 |

FOREIGN PATENT DOCUMENTS

| 3150779 | 7/1983 | Fed. Rep. of Germany | 40/638 |
| 6239850 | 2/1987 | Japan . | |

Primary Examiner—Caleb Weston
Assistant Examiner—Mark A. Osele
Attorney, Agent, or Firm—L. George Legg

[57] ABSTRACT

An apparatus and method are disclosed for removing a sheet such as a release sheet (18) in adherence with a workpiece such as a foam pad (12). The release sheet is contacted with a knife to form a slit, a needle then enters and engages the slit to lift a portion (102) of the release sheet, and a peeler (48) then grasps the lifter portion and peels the release sheet from the workpiece.

15 Claims, 18 Drawing Sheets

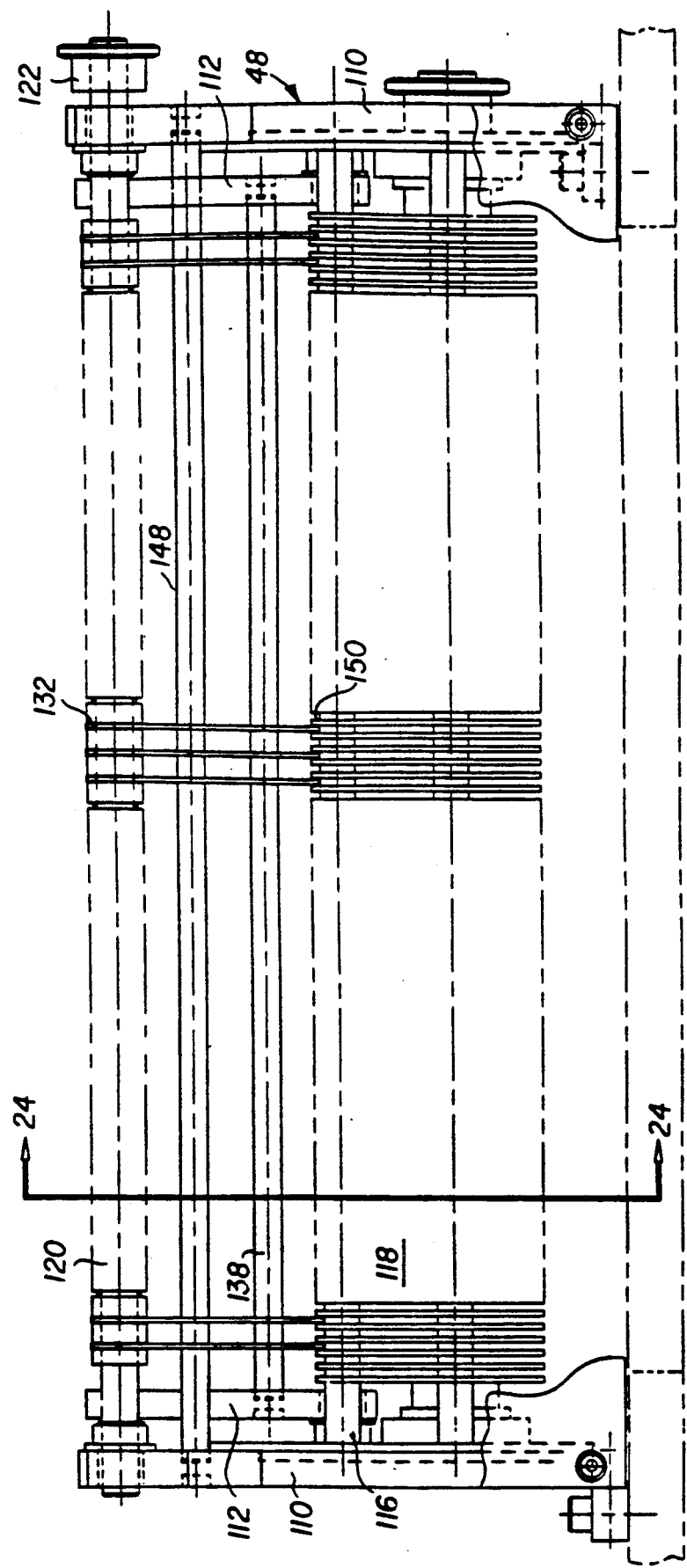

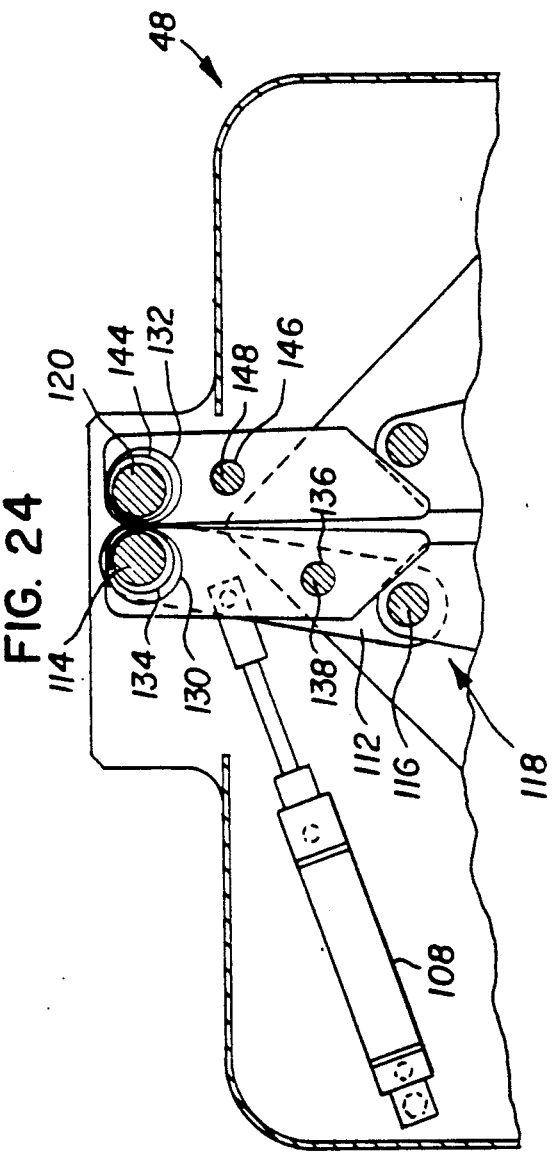
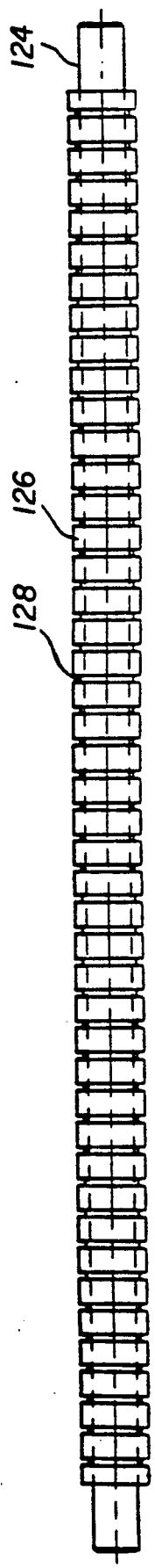

APPARATUS AND METHOD FOR REMOVING A RELEASE SHEET FROM A WORKPIECE

CROSS REFERENCE TO RELATED APPLICATION

This application is related to co-pending U.S. patent application Ser. No. 592,049, filed Oct. 3, 1990, entitled "Apparatus for Peeling a Release Sheet From a Workpiece".

DESCRIPTION

1. Technical Field

The present invention concerns an apparatus and a method for removing a release sheet adhered to a surface of a workpiece. More particularly, the invention concerns an apparatus and method wherein the release sheet is slit, the edges of the release sheet are engaged and lifted at least partially along the slit, and the lifted portions are grasped and at least partially removed from the workpiece.

2. Background Art

Frequently it is necessary to strip a covering sheet of material from a workpiece, for example a release sheet from an adhesive on a substrate, prior to further use of the workpiece. A manufacturer, for example, may have to order and inventory a part, in quantity, having an adhesive on a surface for subsequently attaching the part to another part during manufacturing, and the adhesive may have a release sheet affixed thereto to cover and thus secure the adhesive for the later intended use. It is then necessary to remove the release sheet prior to the intended manufacturing use.

The most common prior art approach to removing a covering sheet or release sheet from a workpiece is to do so manually. This, however, requires a great amount of time, is costly and inefficient, and is a fatigue-inducing task. Other approaches that are either automated or are a combination with manual have been tried as well.

One prior art approach used to remove a release sheet from an adhesive tape or backing employs an adhesive roller to lift the release sheet from the backing. The release sheet can then be removed by manually feeding it to a removal mechanism or by further employing a projecting rod or device that then separates the release sheet from the adhesive roller itself. U.S. Pat. No. 4,508,589 describes apparatus for stripping a protective coating from a substrate in which the protective coating is lifted from the substrate by an adhesive roller, and is then separated from the adhesive roller by a projecting rod, which pushes a portion of the coating between discharge rollers. A disadvantage of this approach is that the release sheet contacted by the adhesive roller has a sufficiently rough surface texture to positively adhere to the adhesive roller, and storing and handling workpieces is more difficult since their release sheets can stick together. Another disadvantage is that the adhesive roller can lose adhesiveness and thus its effectiveness while in use.

Another prior art approach that is used to peel a layer from a substrate uses a cutter guide to form a clearance between the layer and the substrate. A cutting device is inserted into the clearance and then cuts the outer layer from the substrate. For example, U.S. Pat. No. 4,821,971 describes a device for peeling and cutting a surface portion of a paper roll in which a cutter guide is inserted under the surface of the paper roll to form a clearance therein and a cutting device then cuts the outer layer from the paper roll. A disadvantage of this approach to removing a release sheet from a workpiece is that the cutting device can also cut into and remove part of the workpiece itself in addition to removing the intended release sheet.

Other systems for removing a release sheet from a workpiece have also been used. U.S. Pat. No. 4,822,445 describes apparatus for processing a double face adhesive tape having two release papers attached in which the release paper is slit by a knife, a hole is punched in the tape, a stripping roll separates the slit release paper, attaching means attaches a member to the exposed adhesive face of the tape, and detaching means detaches the member, the cut release paper, and the cut tape from the tape. U.S. Pat. No. 4,880,488 describes apparatus and method for removing a protective film release sheet from a substrate in which a film raising means in the form of an adhesive roller raises the film, a film peeling guide member sets the direction of peeling of the film, and film peeling and conveying means peel the film from the substrate.

This invention solves the prior art problems noted above. It can be effective with a release sheet with a smooth outer surface because it does not rely on adhesive means to remove the release sheet. The method and apparatus of the invention can remain in continuous use without having to replace the separating means, for example the adhesive roller as above described, due to decreased effectiveness with repeated or continuous use. The claimed method and apparatus, furthermore, cleanly remove a release sheet adhered to a workpiece without undesirably cutting and removing other layers from the workpiece.

SUMMARY OF THE INVENTION

The primary objective of this invention is to provide a method and apparatus for at least partially removing a covering sheet from an adhesive-coated layer on a workpiece in which operator interaction would be limited to directing a robot to position the workpiece relative to the removal apparatus for subsequent removal without further operator assistance.

A further objective of this invention is to provide such a method and apparatus which automatically affixes the workpiece by its exposed adhesive-coated layer to another workpiece.

These objectives are given only by way of illustrative examples; thus, other desirable objectives and advantages inherently achieved by the disclosed invention may occur or become apparent to those skilled in the art. Nonetheless, the scope of the invention is to be limited only by the appended claims.

In one embodiment of the invention, there is provided an apparatus for at least partially removing from a workpiece a sheet adhered to a surface of the workpiece. A knife having a cutting edge and means for holding the knife are provided. Also provided is means for gripping and moving the workpiece. The knife is provided so that with the sheet engaged with the cutting edge of the knife, the workpiece is moved relative to the knife to at least partially cut the sheet to form a slit having a first and a second edge. Means is provided for entering the slit and engaging an edge of the slit while the workpiece is moved relative to the means for entering and engaging, to lift at least a portion of the sheet along the slit. Means for grasping the lifted portion and at least partially removing the sheet is provided to effectuate at least partial removal of the sheet.

Preferably, the cutting edge of the knife is curved so that the slit formed has a lip along each edge to facilitate entering the slit and engaging the edge. Preferred means for entering and engaging is a substantially nonflexible rod that in a preferred embodiment is a needle with a cylindrical upper surface.

In a preferred embodiment, the means for grasping and removing is a peeler assembly. The peeler assembly has drive means comprising a pair of pinch rollers, each pinch roller having a drive surface thereon, for grasping a lifted portion of the sheet and driving the sheet therebetween. The peeler also comprises a plurality of plate means rotatably mounted on each pinch roller for guiding the sheet away from the drive means.

In another preferred embodiment, the peeler assembly comprises a housing; a first, movable shaft having a first resilient surface; and a second, drive shaft having a second resilient surface. Means is provided for pivoting the first shaft into axial contact with the second shaft. Means is also provided for rotating the second shaft. Each resilient surface has a plurality of axial, circumferentially extending grooves. The peeler also comprises a first and a second plurality of feed plates. In a preferred embodiment, each of the first plurality of feed plates is loosely and rotatably mounted by a first bore in one of the grooves of the first shaft, and each of the second plurality of feed plates is loosely and rotatably mounted by a second bore in one of the grooves of the second shaft. Thus, when the first shaft is pivoted toward axial contact with the second shaft, each feed plate on the first and second shafts is contacted by the opposing shaft or by one of the feed plates on the opposing shaft, so that the feed plates retract into their respective grooves to allow the first resilient surface to axially contact the second resilient surface. The preferred means for moving the shafts into mutual contact is an adjustable pneumatic piston that can be used to adjust the pinch roller contact force. The peeler preferably includes a shredder. The shredder head preferably has grooves in which to snuggly position the feed plates.

The method of at least partially removing a covering sheet adhered to a workpiece from the workpiece in accordance with the invention comprises at least partially cutting the sheet to form a slit having a first edge and a second edge; providing a substantially nonflexible rod; entering the slit and engaging one of the edges with the rod by moving the workpiece relative to the rod, thereby lifting at least a portion of the sheet from the workpiece along the slit; and grasping the portion and pulling the sheet at least partially away from the workpiece while moving the workpiece transverse to the direction of the pulling.

In a preferred method of the invention, after said lifting step and before said grasping and pulling step, is added the step of lifting the sheet along the other edge to lift a second portion of the sheet, and then grasping the second portion. In another preferred embodiment, the grasping step comprises the steps of providing a pair of pinch rollers, each pinch roller having a drive surface thereon, for grasping a lifted portion of the sheet and driving the sheet therebetween; providing a plurality of plate means for guiding the sheet away from the drive means; rotatably mounting the plurality of plate means on the pinch rollers; axially contacting the pinch rollers to grasp the portion; and rotating the pinch rollers toward one another to remove the sheet from such workpiece and drive the sheet between the plate means.

BRIEF DESCRIPTION OF THE DRAWINGS

In the accompanying drawings:

FIG. 23 is a front elevation, fragmentary view of a peeler assembly according to the invention taken along line 23—23 of FIG. 22.

FIG. 24 is a sectional, fragmentary view taken along line 24—24 of FIG. 23, illustrating details of the peeler assembly with the pinch rollers closed.

FIG. 26 is a plan view of a pinch roller according to the invention.

DESCRIPTION OF THE PREFERRED EMBODIMENTS

Figure 1:
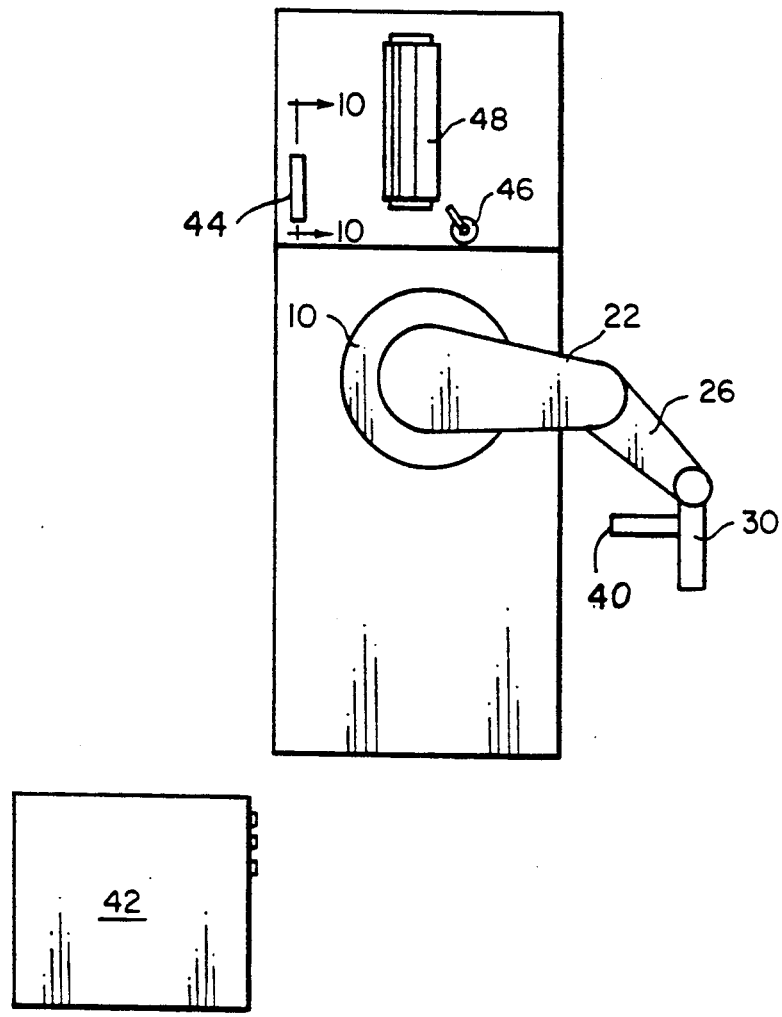
FIG. 1 is a plan view of an apparatus embodying the invention.
Figure 2:
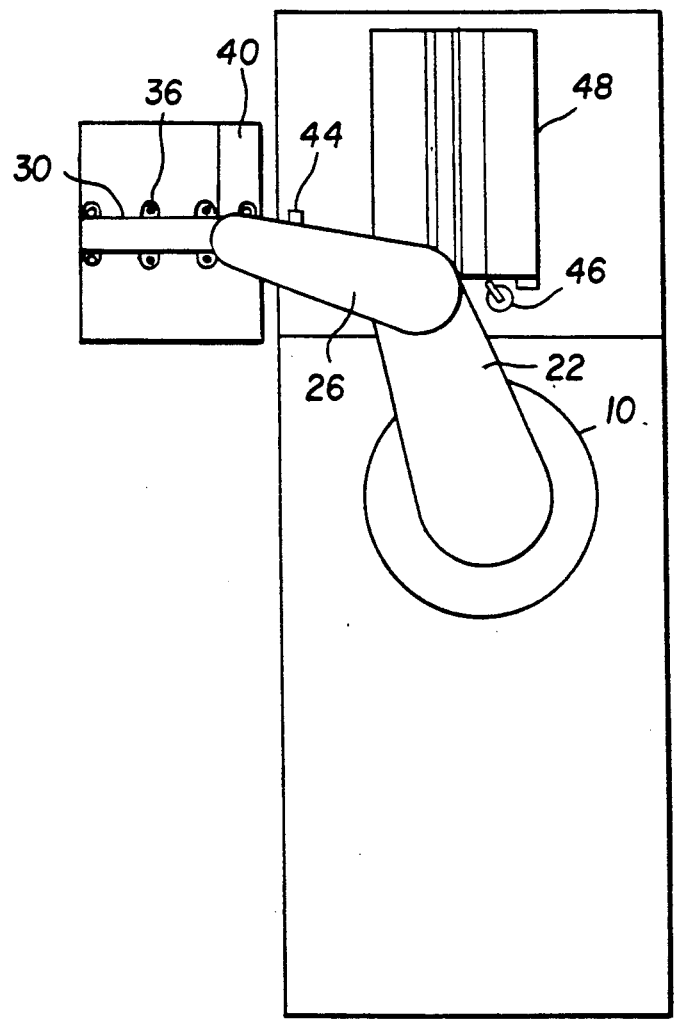
FIG. 2 is a fragmentary plan view of the apparatus of FIG. 1, indicating the relative positions of the robot and robot arm, programmable controller, knife, and peeler assembly, as configured when a foam pad, having both an adhesive-coated layer and a release sheet on each side, is picked up by the robot from the conveyor.

The following is a detailed description of the preferred embodiments of the invention, reference being made to the drawings in which the same reference numerals identify the same elements of structure in each of the several Figures.

FIGS. 1 to 6 illustrate a plan view of the apparatus according to the invention. A conventional pedestal mount robot 10 of the general type illustrated in FIG. 7 is provided as a means for gripping and moving foam pad 12. Other types of robots could also be used in the practice of the invention, for example, a gantry robot. One skilled in the art can readily determine what type of robot to use, and this may depend upon such factors as the size and weight of the workpieces being worked with, the response and cycle times desired, and so forth.

Figure 8:
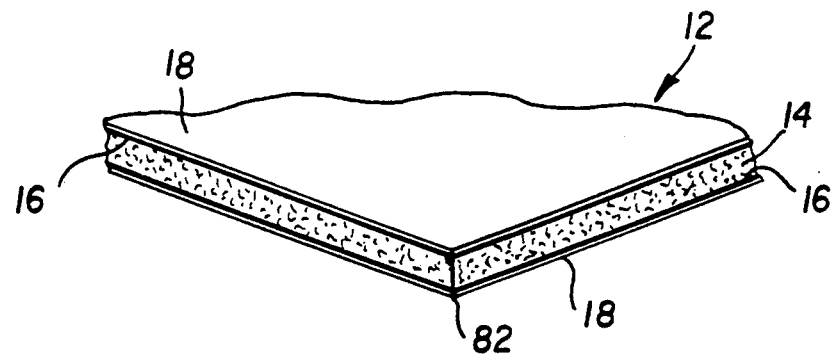
FIG. 8 is an enlarged fragmentary, perspective view of the foam pad having an adhesive-coated layer and a release sheet on each side.

A foam pad 12 is positioned within the working radius of robot 10. Foam pad 12 may be so positioned manually or by conventional conveyor means such as a conventional belt conveyor. Foam pad 12 as illustrated in FIG. 8 comprises a foam core 14 having an adhesive-coated layer 16 on each side and a release sheet 18 removably affixed to each adhesive-coated layer 16. For example, foam core 14 may be a lamina of polyurethane foam having a thickness in the range of from about 2 to about 15 mm, to which an adhesive-coated carrier layer has been applied on each side. Release sheet 18, for example, may be a conventional paper having a thickness of about 0.15 mm.

As seen in FIG. 7, robot 10 has a body 20 that has pivotally attached thereon a first effector arm 22 that rotates with respect to central axis 24. Arm 22 is pivotally attached to one end of a second, end effector arm 26. Arm 26 has on its outer end a conventional linear actuator 28 operatively attached to a removable gripper 30 by a conventional wrist 32. Arm 2, arm 26, actuator 28, and wrist 32 cooperate conventionally as is well known in the art to move gripper 30.

Figure 9:
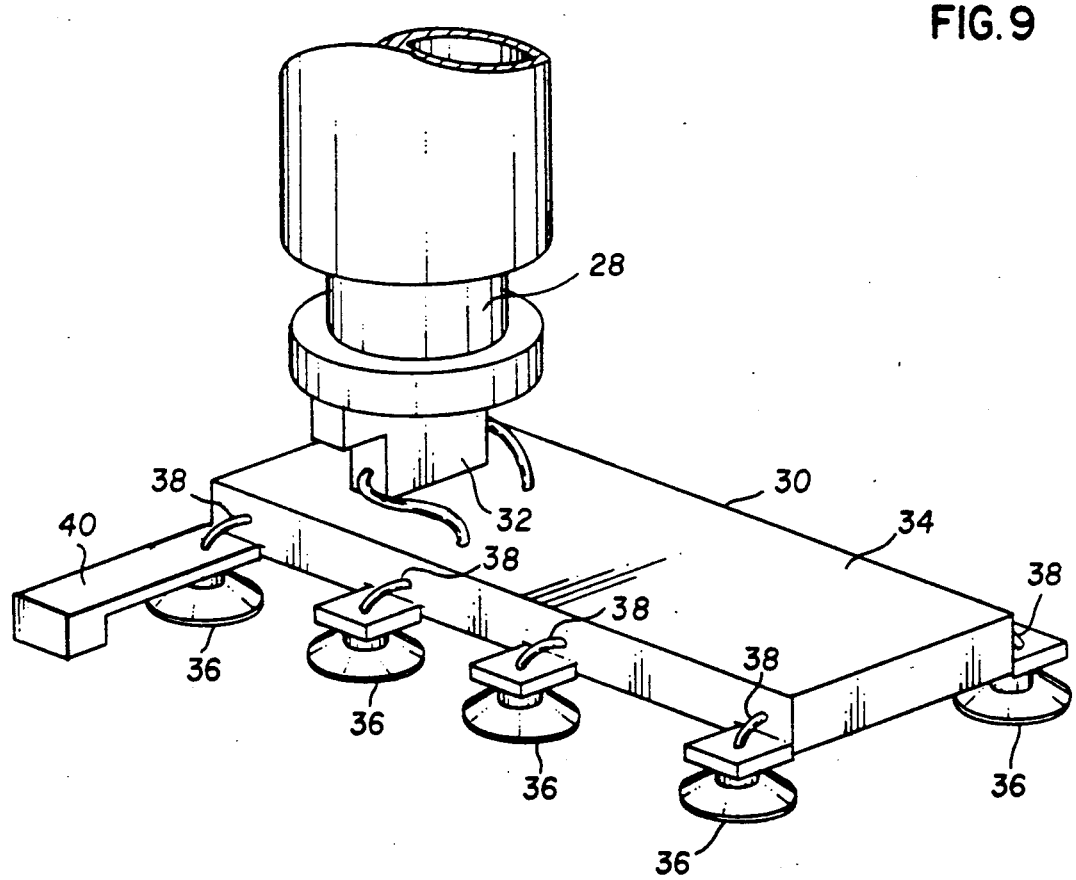
FIG. 9 is an enlarged, fragmentary perspective view of the robot gripper.

As shown in FIG. 9, gripper 30 comprises gripper arm 34 having a plurality of gripper vacuum cups 36 on the bottom thereof for holding foam pad 12. Each of vacuum cups 36 is operatively connected to a vacuum line 38 that is connected to a vacuum means (not illustrated) in the familiar manner. Backer plate 40 is affixed to gripper arm 34, and extends from a side of gripper arm 34 and beyond vacuum cups 36. The lower surface of backer plate 40 is in about the same plane as vacuum cups 36 when gripping foam pad 12. Backer plate 40 functions as a support surface to support foam pad 12 when operations as described below are performed on or near a corner of foam pad 12. Alternatively, should it be desired to perform the operations not on or near a corner of foam pad 12 but, for example, near an edge of foam pad 12, one skilled in the art can readily position a backer plate on gripper arm 34 to function as a suitable support.

Gripper 30 is removable manually or as directed by a conventional programmable controller 42, and a first such gripper 30 may therefore be removed and another gripper 30 be attached to wrist 32. For example, such replacement may be desirable should the first gripper 30 become inoperative, or should another size foam pad 12 be worked on. In the latter example, gripper 30 may be so sized as to operatively accept a compatibly-sized foam pad 12.

Programmable controller 42 preferably transmits operating signals to robot 10 by conventional transmitting means such as wiring (not illustrated), thereby automatically controlling the movements of robot 10, although alternatively such operating signals can be transmitted to robot 10 manually by an operator. Programmable controller 42 is able to direct the independent and selective movement of first effector arm 22, end effector arm 26, linear actuator 28 and gripper 30. "Working radius" as used herein refers to the capability of robot 10 to perform a task at a specified distance from and at a specified coordinate relative to robot central axis 24 and is determinable by reference to robot specifications such as maximum reach, minimum reach, vertical clearance height, payload, and joint rotation as understood by those skilled in the art. Robot 10 may be redirected or reprogrammed by one skilled in the art to conform its movements to specific operating parameters and conditions, as for example the size and dimensions of foam pad 12.

Figure 3:
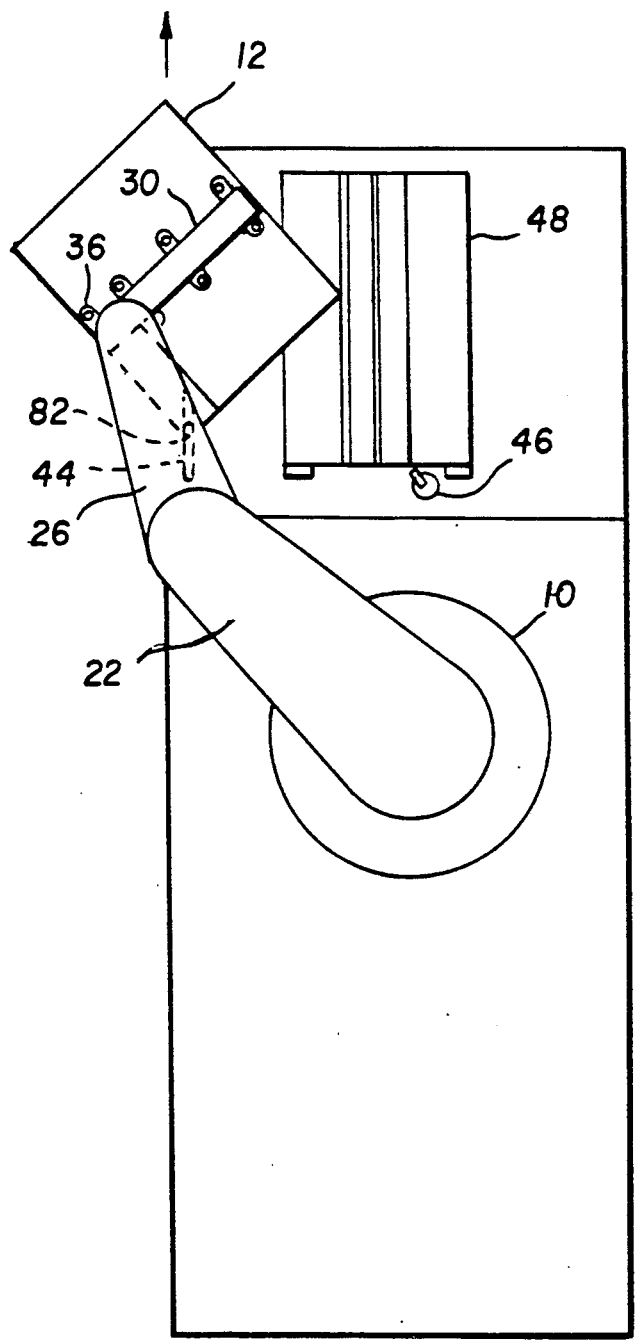
FIG. 3 is a fragmentary plan view of the apparatus of FIG. 1 as configured when a foam pad is positioned by the robot on the knife.
Figure 4:
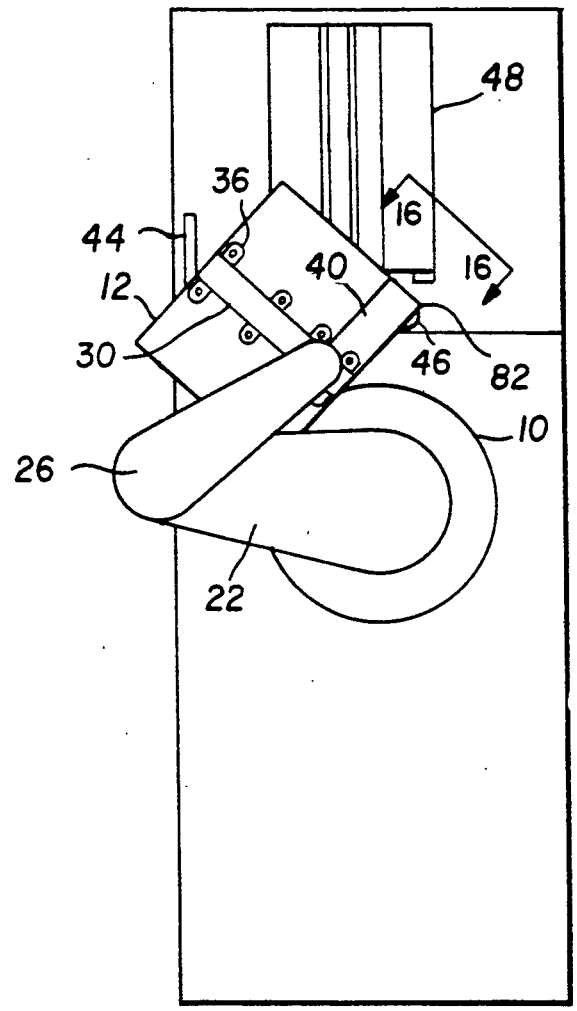
FIG. 4 is a fragmentary plan view of the apparatus of FIG. 1 as configured when a foam pad having a slit in its release sheet is positioned by the robot on the needle.
Figure 5:
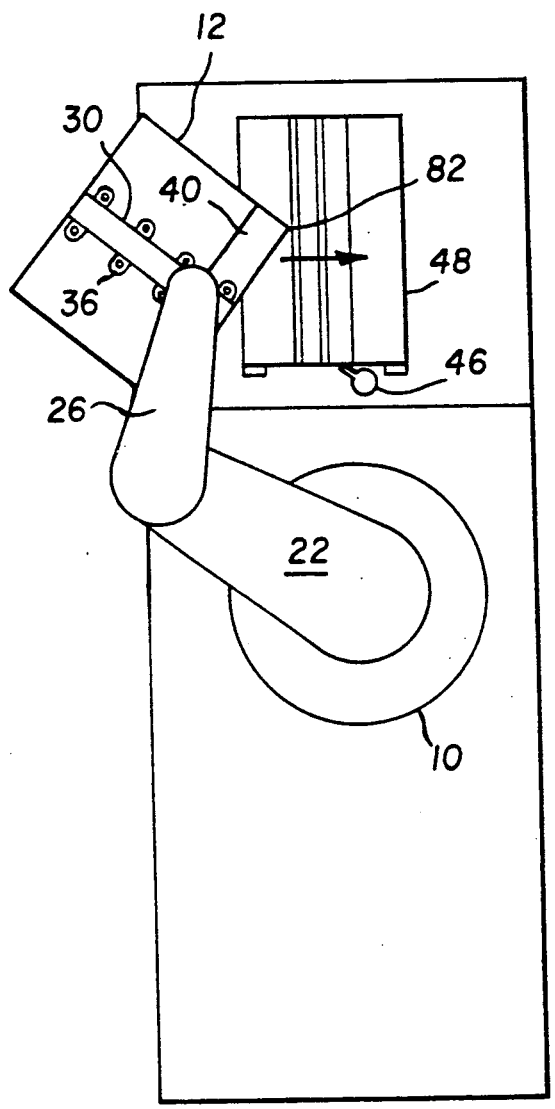
FIG. 5 is a fragmentary plan view of the apparatus of FIG. 1 as configured when a foam pad having a lifted edge of a release sheet is gripped by the robot gripper and positioned for the lifted edge to be grasped by the peeler assembly.
Figure 10:
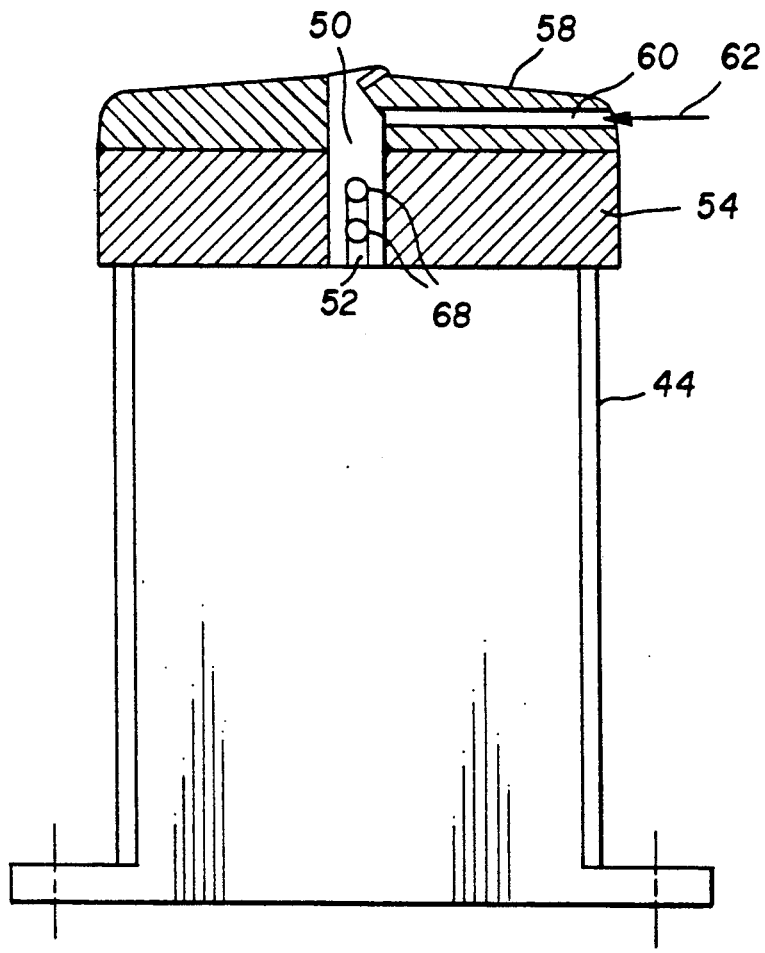
FIG. 10 is a front elevation view, partially in section, of the knife assembly as seen looking in direction 10—10 on FIG. 1.
Figures 11, 12:
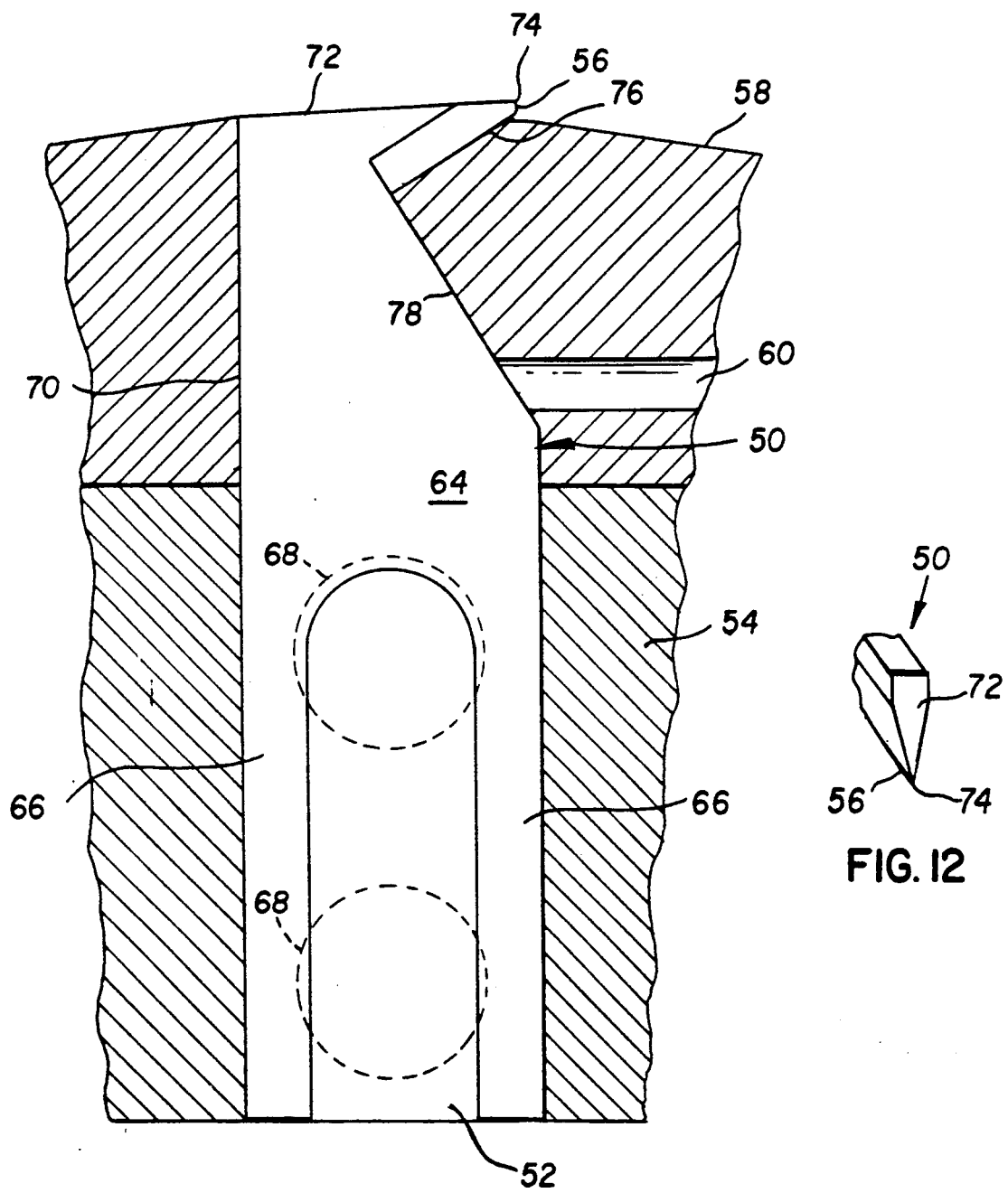
FIG. 11 is an enlarged, fragmentary view of the assembly of FIG. 10, illustrating details of the knife.
FIG. 12 is an enlarged, perspective, fragmentary view illustrating details of the knife.

As shown schematically in FIGS. 1 to 4, 6, and 7, and in detail in FIGS. 10 to 12, a knife assembly 44 is positioned within the working radius of robot 10. Further to the right, as seen in FIG. 1, is a needle assembly 46, also within the working radius of robot 10. Between knife assembly 44 and needle assembly 46 is a peeler 48, also within the working radius of robot 10, with the upper portions of assembly 44 and assembly 46 being roughly coplanar horizontally with the upper portion of peeler 48. Assembly 44, assembly 46, peeler 48, and robot 10 in the embodiment described herein are rigidly mounted to a worksurface, but it will be understood by one of ordinary skill in the art that any suitable mounting may be selected in the practice of the invention. The relative positions and locations of the assemblies described in this paragraph may be varied by one skilled in the art to accord with a particular design and design parameters. For example, assembly 46 is shown in FIGS. 1 and 4 positioned differently than in FIGS. 2-3 and 5-6 for purposes of illustration, although the preferred position described herein is that of FIGS. 1 and 4.

Foam pad 12 is positioned within the working radius of robot 10. Robot 10 in response to operating signals from programmable controller 42 positions gripper 30 to contact foam pad 12 with gripper vacuum cups 36 substantially flush against the surface of a release sheet 18 on foam pad 12. Sufficient vacuum is applied by the vacuum means through vacuum lines 38 to gripper vacuum cups 36 while contacting foam pad 12 to secure foam pad 12 to gripper vacuum cups 36. The amount of vacuum to apply is readily determinable by the operator and can be dependent on such factors as the weight of foam pad 12 or other selected workpiece, whether other forces are present that are also bearing on the workpiece, and the sensitivity of the workpiece and its surfaces to deformation caused by vacuum cup pressure on its surface and any consequent effect of such deformation on the utility of the workpiece.

Robot 10 in response to operating signals from programmable controller 42 moves gripper 30 to position foam pad 12 such that a portion of release sheet 18 proximate to a corner 82 in release sheet 18 on the underside of foam pad 12 opposite the side in contact with vacuum cups 36 engages knife 50 of knife assembly 44. As illustrated in FIGS. 10, 11, and 12, knife assembly 44 comprises knife 50 mounted in a recess 52 in a knife holder 54, which is means for holding knife 50. Knife 50 is mounted so that cutting edge 56 protrudes above upper surface 58 of knife holder 54. As seen in FIG. 10, bore 60 extends through the upper portion of holder 54, from the front of knife holder 54 before curved cutting edge 56 through to recess 52 behind knife 50. Vacuum is applied by any conventional vacuum means 62 to bore 60 to suction paper fibers and other particulates from knife 50 and cutting edge 56. As illustrated in FIGS. 10 and 11, knife 50 comprises a body portion 64 having a pair of depending legs 66 which pass on either side of mounting dowels 68 in holder 54 in the completed knife assembly 44. The rear edge 70 of body portion 64 extends upward to a point approximately flush with upper surface 58 shown in FIG. 10 and in FIG. 11. Upper edge 72 of knife 50 rises upwardly in the direction of tip 74 of knife 50 so that tip 74 is elevated above upper surface 58 by a distance approximately equal to the thickness of release sheet 18. When the release sheet has a substantially uniform thickness, the knife is positioned relative to the upper surface such that the cutting edge is exposed by a distance from the upper surface which is preselected to be substantially the same as the thickness of the release sheet. From tip 74, cutting edge 56 extends downwardly and curves rearwardly to terminate at edge 76 which is angled downwardly and rearwardly at an angle of approximately 25 degrees to upper surface 58 near tip 74. Edge 76 terminates at a downwardly and forwardly angled edge 78 to the forward one of depending legs 66. As shown in FIG. 12, knife 50 preferably has a maximum thickness of about 1 mm and tapers at an angle of about 12.5 degrees to cutting edge 56.

Figure 14:
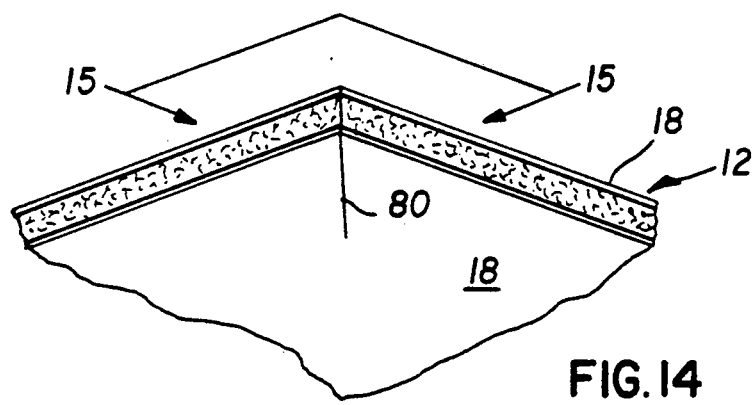
FIG. 14 is an enlarged, fragmentary cross-sectional view of a foam pad according to the invention with a slit in a release sheet.
Figure 15:
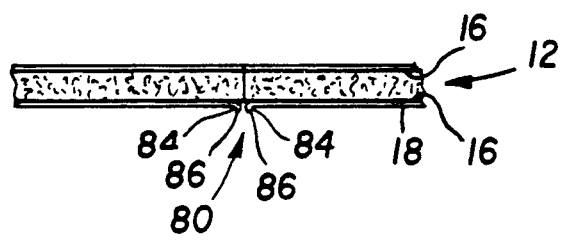
FIG. 15 is a view taken along line 15—15 of FIG. 14 showing details of the slit.
Figure 13:
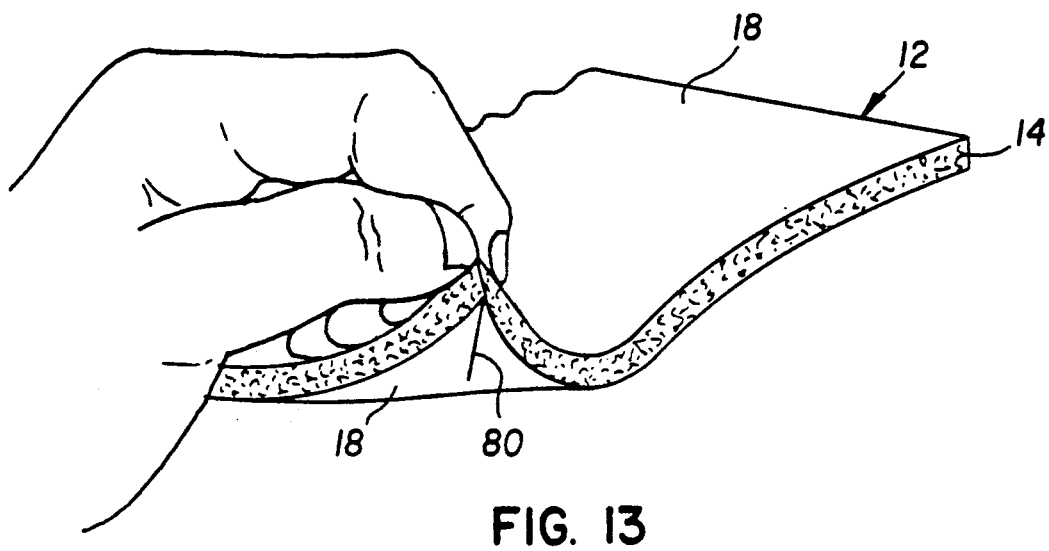
FIG. 13 is an enlarged, fragmentary front elevation view of a foam pad with a slit in a corner of its release sheet with the corner turned up to illustrate the slit.

After engaging release sheet 18 at a location spaced in from the edges of release sheet 18 with knife 50 as above-described, robot 10 moves foam pad 12 diagonally over knife 50 in the direction indicated by the direction arrow in FIG. 3 while release sheet 18 is so engaged to the position shown in FIG. 3 to form a short slit 80 through release sheet 18. While release sheet 18 is so engaged and slit, backer plate 40 supports foam pad 18 at corner 82 to maintain foam pad 18 substantially horizontal. FIG. 3 illustrates the approximate position of foam pad 12 relative to knife 50 when cutting edge 56 (not shown) has exited slit 80 (not shown) at corner 82. As illustrated in FIGS. 13 to 15, slit 80 extends from about the location of initial contact of knife 50 with release sheet 18, as described above, therethrough to corner 82 of release sheet 18. In FIG. 13, foam pad 12 is shown turned up from its usual horizontal position to bring corner 82 and slit 80 into view. In order that slit 80 pass through release sheet 18 but knife 50 not substantially penetrate adhesive-coated layer 16 and foam pad 12, cutting edge 56 is rigidly secured in knife holder 54 and positioned to protrude a distance above upper surface 58 approximately equal to the thickness of release sheet 18. Foam pad 12 is resilient, that is, having at least some give, and it is within the skill of the operator to determine by calculation or by trial run the contact force of foam pad 12 against knife 50. For example, in the specific embodiment shown herein, foam pad 12 should contact knife 50 with sufficient contact force to form slit 80 entirely through release sheet 18 but also to minimize scoring by knife 50 of overlying adhesive-coated layer 16 and foam pad 12. The proper contact force to apply can depend on the resiliency of foam pad 12 or other selected workpiece and is well within the skill of the operator to determine. As above-described, backer plate 40 provides support for foam pad 12 to keep foam pad 12 approximately coplanar to knife 50 to produce the desired contact force.

Cutting edge 56, due to its shape as above-described and as illustrated in FIGS. 10-12, imparts to each of two edges 84 of slit 80 thus formed a raised lip 86, as shown in FIG. 15. Lip 86 facilitates the engaging of slit 80 by a needle 88 as described below, although such can also be accomplished but with more difficulty without such a lip.

Those skilled in the art will appreciate that it is within the scope of the invention to form slit 80 at any convenient location in release sheet 18. Thus, for example, a slit can be introduced at a side edge of release sheet 18 and extended entirely or partially to an adjacent or opposite side. Or, release sheet 18 can be scored instead of slit, that is, a cut introduced that does not go entirely therethrough, in which case needle 88 can also separate an edge of release sheet 18 at the score as it lifts the edge. A potential difficulty with this approach is that some parts of release sheet 18 may not be removed, so that adhesive-coated layer 16 may not be entirely exposed; however, a partially exposed adhesive-coated layer 16 may suffice for some applications. Furthermore, one skilled in the art can select an adhesive material of an adhesive strength and/or can selectively distribute adhesive-coated layer 16 on foam pad 12, to minimize or eliminate this potential difficulty.

Figure 16:
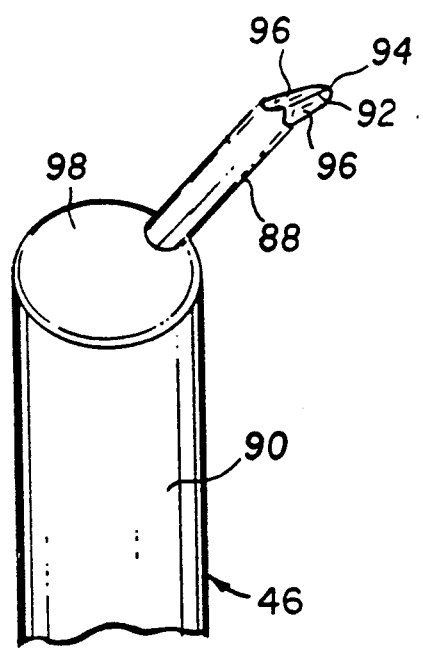
FIG. 16 is an enlarged, fragmentary front elevation view of the needle assembly according to the invention as seen looking in direction 16—16 of FIG. 4.

Means for entering slit 80 and engaging an edge 84 to lift release sheet 18 from adhesive-coated layer 16 can comprise a substantially nonflexible rod that in the preferred embodiment is provided by metal needle 88. The permissible amount of flex of the rod is readily determinable by one skilled in the art and is selected so to positively allow the entering and engaging described below. Robot 10 in response to operating signals from programmable controller 42 moves foam pad 12, to enter needle 88 in slit 80 and engage an edge 84. FIG. 4 shows the position of foam pad 12 relative to needle 88 with foam pad 12 positioned so that needle 88 engages an edge 84 (not shown) of slit 80. As illustrated in FIG. 16, needle assembly 46 comprises a cylindrical needle 88 rigidly mounted and projecting upwardly from a base 90, with the axis of needle 88 at about a 45 degree angle to the axis of base 90. The axis of base 90 is approximately parallel to central axis 24 of robot 10. Needle 88 has a cylindrical top surface 92 having a leading tip 94 and having side surfaces 96 as shown. The cylinder axis of cylindrical top surface 92 is approximately parallel to the top surface 98 of base 90, lies between surface 92 and surface 98, and approximately intersects the axis of needle 88.

Figure 17:
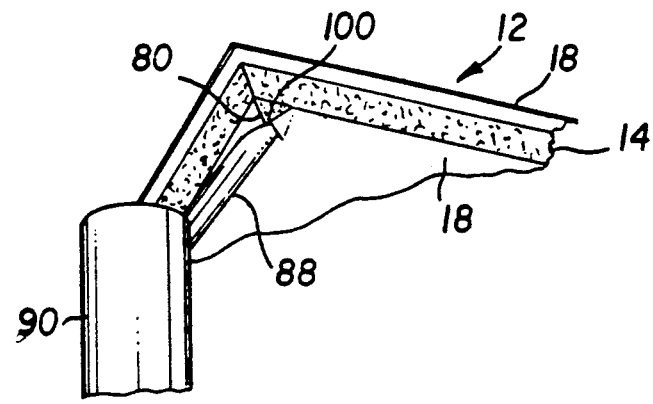
FIG. 17 is a perspective view of the needle entered into a slit in a release sheet according to the invention as seen in direction 16—16 of FIG. 4.
Figure 18:
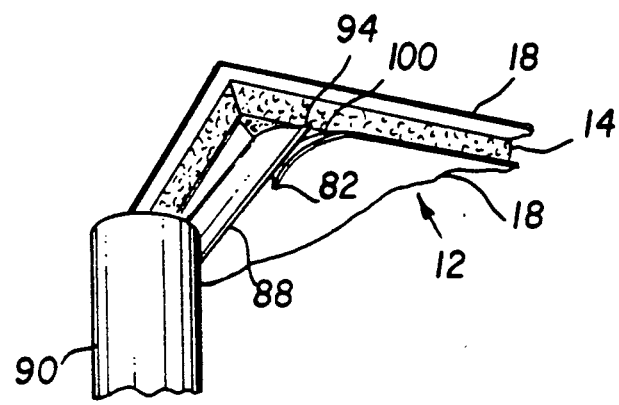
FIG. 18 is a perspective view of the needle engaged in a slit in a release sheet having a lifted portion according to the invention, and is essentially the same view as seen looking in direction 16-16 of FIG. 4.
Figure 19:
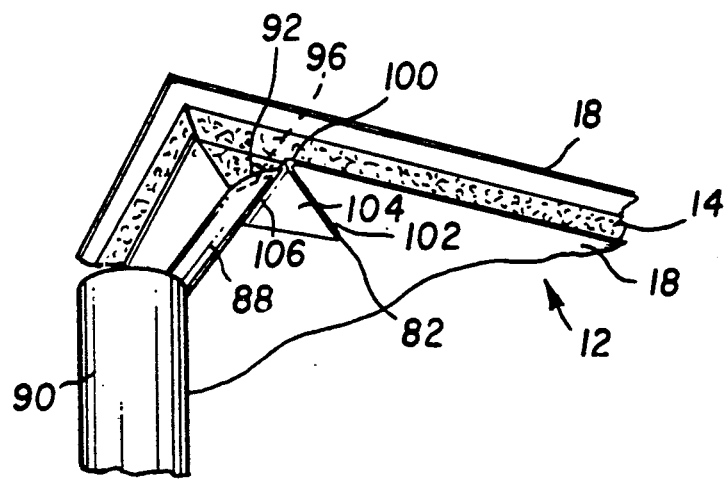
FIG. 19 is a perspective view of the needle contacting the underside of a lifted portion of a release sheet according to the invention, and is essentially the same view as seen looking in direction 16—16 of FIG. 4.

FIGS. 17, 18, and 19 illustrate sequential positions of foam pad 12 as it is moved to position slit 80 relative to needle 88. In each position illustrated therein and in each such movement described below, robot 10 maintains foam pad 12 horizontal, so that foam pad 12 is substantially parallel to top surface 98 of needle base 90. Backer plate 40 supports foam pad 12 approximately coplanar for the lifting operation described below.

FIG. 17 illustrates the relative positions of needle 88 and slit 80 when robot 10 moves foam pad 12 to engage needle 88 in slit 80. Raised lip 86 of slit 80 allows tip 94 of needle 88 to enter slit 80 and engage an edge 84 so that tip 94 is positioned between foam pad 12 and release sheet 18 with top surface 92 in contact with layer 16. Foam pad 12 is then moved in the direction indicated by the direction arrow in FIG. 4 while tip 94 is so positioned, such that tip 94 describes approximately a straight line of travel from slit 80 to an edge 100 of release sheet 18 relative to tip 94, thereby lifting a portion 102 of release sheet 18 that includes corner 82 as shown in FIG. 18. As shown therein, the outer edges of lifted portion 102 extend from corner 82 to edge 100 and from corner 82 to slit 80, and it is necessary in the practice of the invention to so lift such entire lifted portion 102 for grasping as below described. One skilled in the art can readily select operating specifications, such as adhesive strength, length of slit, size and shape of needle and so forth, that will result in the entire portion being so lifted. The cylindrical shape of top surface 92 facilitates needle 88 engaging edge 84 without tip 94 catching in core 14. Lip 86 allows tip 94 to engage edge 84 with less contact force than when practicing the invention without such a lip, and thus further reduces the possibility that tip 94 could catch in core 14.

Figure 20:
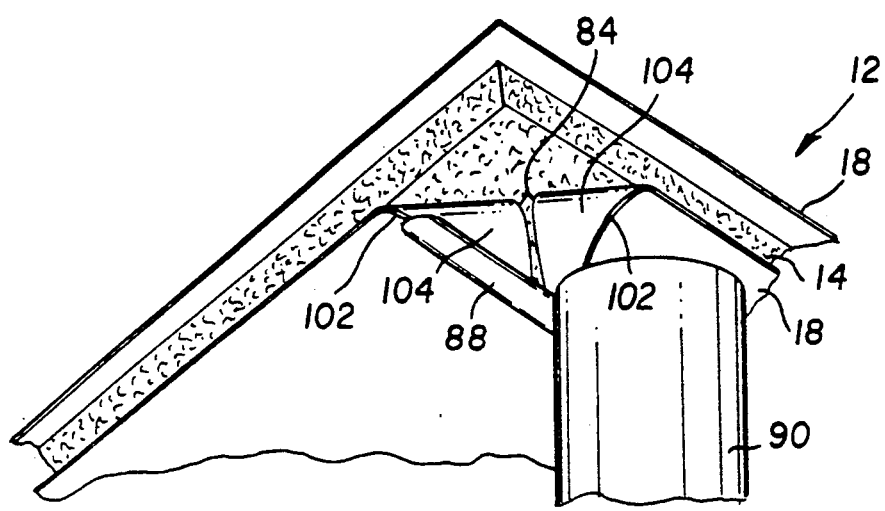
FIG. 20 is a perspective view of a foam pad having a lifted, folded back corner of a release sheet along both edges of a slit in the release sheet, as viewed essentially opposite to the view looking in direction 16—16 of FIG. 4.

Foam pad 12 is then moved to position side surface 6 of needle top surface 92 adjacent to underside 104 of lifted portion 102 with top surface 92 in contact with core 14. Foam pad 12 is then moved so that side surface 96 contacts underside 104 with a contact pressure determined by the operator and presses lifted portion 102 against release sheet 18, thereby folding back lifted portion 102 and forming crease 106, thus further exposing underside 104, as shown in FIG. 19. The angle of fold between underside 104 and foam pad 12 will vary as a function of the contact pressure of side surface 96 with lifted portion 102, that is, as the contact pressure is increased the angle of fold will also increase. The above-described sequence of engaging, lifting and folding is then repeated on release sheet 18 along unlifted edge 84 of slit 80. FIG. 20 illustrates foam pad 12 having lifted portions 102 along both edges 84 such that lifted portions 102 form about a 90 degree angle of fold to foam pad 12. The angle of fold does not have to be 90 degrees as long as the lifted portion is able to be grasped as described below. A skilled practitioner can readily determine the contact pressure to be applied to form a desired angle of fold in the practice of the invention. Alternatively, the release sheet with the lifted portion without being so folded may be suitable for the below-described peeling operation, depending on the particular operative conditions required in a particular application. One skilled in the art can readily determine whether folding the lifted portion is desirable or necessary.

The invention as above-stated may also be practiced by introducing a slit not to or near a corner of release sheet 18 but instead to an edge 100. In the latter embodiment, needle 88 is entered into the slit and engaged with an edge of the slit near an edge 100. Needle 88 contacts release sheet 18 and foam pad 12 is moved relative to needle 88 in the manner described above to lift a portion of release sheet defined by edge 100, the slit, and the line of travel of needle 88 from the slit to edge 100. After removing part of release sheet 18 as above, it will be noted that an unremoved portion of release sheet 18 remains. The above removal sequence can be repeated with the unlifted edge 84 to complete removal of release sheet 18.

Peeler 48 is provided as means for grasping lifted portion 102 and at least partially removing release sheet 18 from foam pad 12. The drive means of peeler 48 comprise a pair of pinch rollers. As illustrated in FIGS. 21 to 26, peeler 48 comprises a pair of adjustable pneumatic cylinders 108 mounted on opposite interior surfaces of a housing comprising end walls 110. Adjustable pneumatic cylinders 108 are means for pivoting the pinch rollers into and out of mutual axial contact and are also means for adjusting pinch roller contact force. Each cylinder 108 is pivotally attached to the adjacent end wall 110 at its respective head end. The actuator rod of each cylinder 108 is pivotally attached between the ends of a pivot arm 112. Each cylinder 108 is adjustable to select the pneumatic force on each actuator rod and thereby adjust the contact force between the pinch rollers. Each pivot arm 112 is rotatably mounted at a bearing to each respective end of a first pinch roller comprising movable nip roller shaft 114, and is rotatably mounted at a bearing to each respective end of a fixed pivot shaft 116 which in the embodiment described herein also supports a shredder head 118 of a conventional shredder assembly (not illustrated) between end walls 110. The combination peeler 48 and shredder is a preferred embodiment of the invention, although alternatively peeler 48 can be used without a shredder.

The second pinch roller is a fixed nip roller drive shaft 120 that is rotatably mounted by a journal at each end to bearings in end walls 110 such that the axis of drive shaft 120 is substantially parallel to the axis of movable shaft 114 and lies in approximately a horizontal plane therewith when cylinders 108 are extended to contact movable shaft 114 with drive shaft 120. Drive shaft 120 has at one end thereof drive sprocket 122 that is associated with a drive means (not illustrated). Drive means, for example, can comprise a direct drive gear motor having a gear engaged with drive sprocket 122, or a motor having a drive chain engaged with drive sprocket 122. Movable shaft 114 and drive shaft 120 preferably remain in a closed position, that is, movable shaft 114 has not been retracted by cylinders 108, when peeler 48 is in a stand-by mode. However, the stand-by position of these shafts are within the operator's discretion in practicing the apparatus and method of the invention.

As further illustrated in FIG. 26, both movable shaft 114 and drive shaft 120 comprise a metal shaft 124, having nonrotatably affixed thereon a polyurethane coating 126 having a plurality of axial, circumferentially extending grooves 128 spaced equally apart. Each of grooves 128 guides and axially secures one of a plurality of feed plates 130 on shaft 114 and one of a plurality of feed plates 132 on shaft 120. Feed plates 130 and 132 are plate means for guiding removed release sheet 18 away from shafts 114 and 120. The plate means are rotatably mounted on each respective pinch roller. The plate means are shaped and are positionable to allow the pinch rollers to contact axially. In the preferred embodiment described herein, each feed plate 130 has a first bore 134 therethrough by which it is loosely and rotatably mounted in groove 128 of polyurethane coating 126 on movable shaft 114. Each feed plate 130 has a second bore 136 therethrough for rotatably receiving a guide shaft 138. Guide shaft 138 is rigidly mounted between the ends of pivot arms 112. Each feed plate 132 has a first bore 144 therethrough by which it is loosely and rotatably mounted in groove 128 of polyurethane coating 126 on drive shaft 120. Each feed plate 132 has a second bore 146 therethrough for rotatably receiving a mounting shaft 148 which extends between end walls 110. The loose mounting of each feed plate in each respective groove described above permits retraction of each feed plate into its respective groove when the feed plate upon contact by the opposing shaft or by a feed plate on the opposing shaft, permitting the pinch rollers to axially contact.

Feed plates 130 and 132 each are sized to fit snuggly into one of a plurality of grooves 150 in shredder head 118. Means for permitting feed plates 130 and 132 to retract into grooves 128 comprise bore 134 in feed plate 130 and bore 144 in feed plate 132 which are sized larger than grooves 128 on shafts 114 and 120, respectively. Feed plates 130 and 132 are spaced uniformly on shafts 114 and 120 and positioned so that each of feed plates 130 is opposite one of feed plates 132. Consequently, when peeler 48 is running so that movable shaft 114 and drive shaft 120 are closed, feed plates 130 on movable shaft 114 contact feed plates 132 on the opposing drive shaft 120, thus causing the upper ends of the feed plates to retract into their respective grooves 128. The retraction results in movable shaft 116's polyurethane coating 126 axially contacting drive shaft 120's polyurethane coating 126. Independent rotation of drive shaft 120 then causes movable shaft 114 to dependently rotate in the opposite direction, that is, the pinch rollers rotate toward one another, with feed plates 130 and 132 non-rotational. Similarly, with a release sheet 18 positioned between the pinch rollers, drive shaft 120 causes movable shaft 114 to rotate, driving release sheet 18 therebetween. In an alternate embodiment, means for causing feed plates 130 and 132 to retract could constitute independent means not dependent on contact with an opposing shaft or feed plate. For example, a retractable rod connecting a plurality of feed plates is means for retracting the plurality of feed plates.

Figure 21:
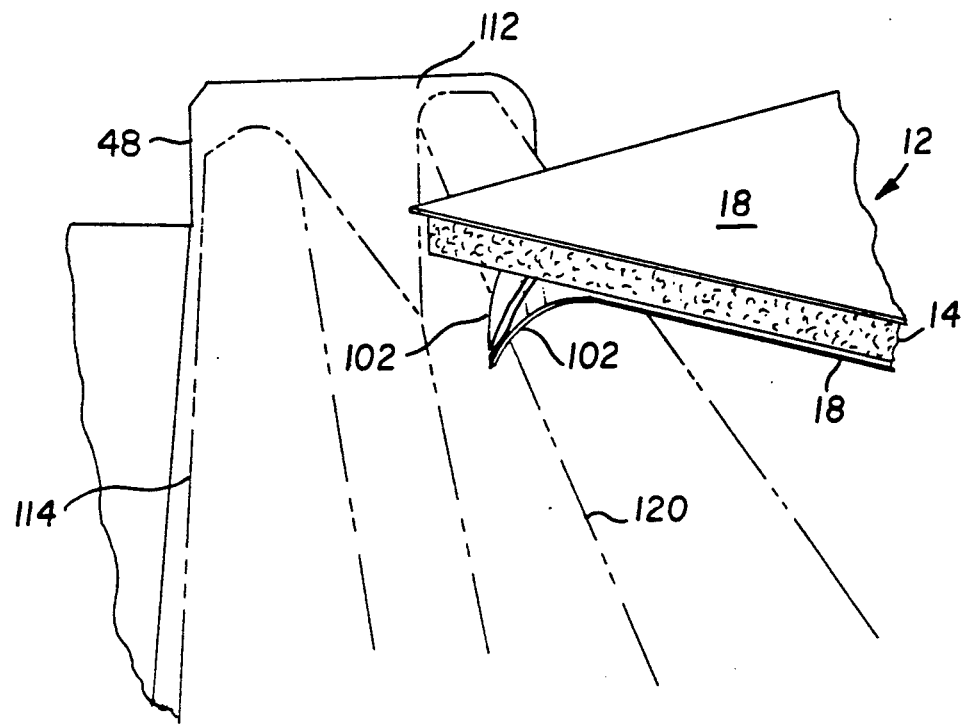
FIG. 21 is a perspective view of a lifted corner of a release sheet on a foam pad positioned between the pinch rollers of a peeler assembly according to the invention with the pinch rollers in an open position.
Figure 25:
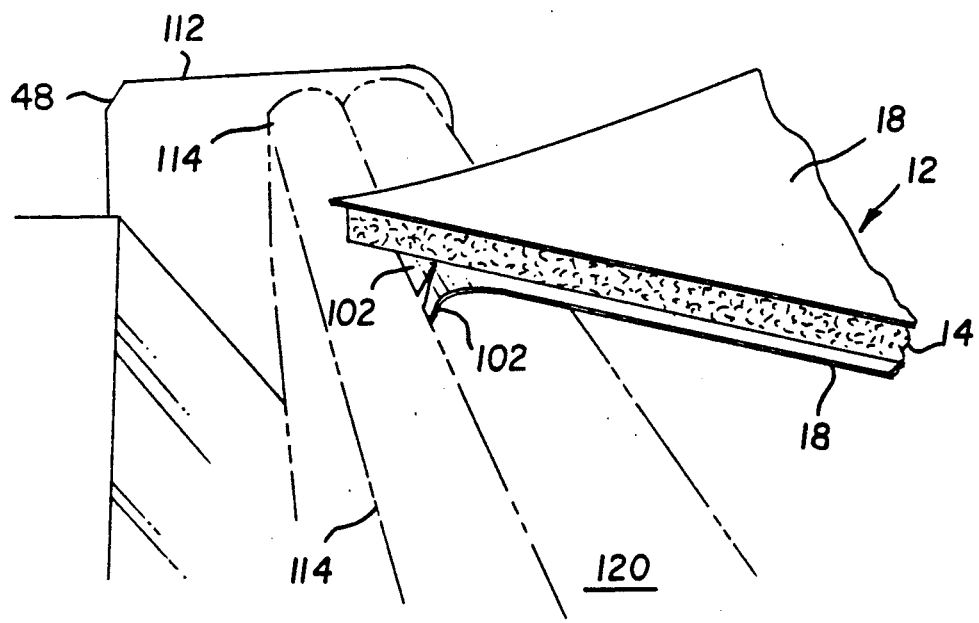
FIG. 25 is a perspective view of a lifted corner of a release sheet on a foam pad positioned between the pinch rollers of a peeler assembly according to the invention with the pinch rollers in a closed position.
Figure 22:
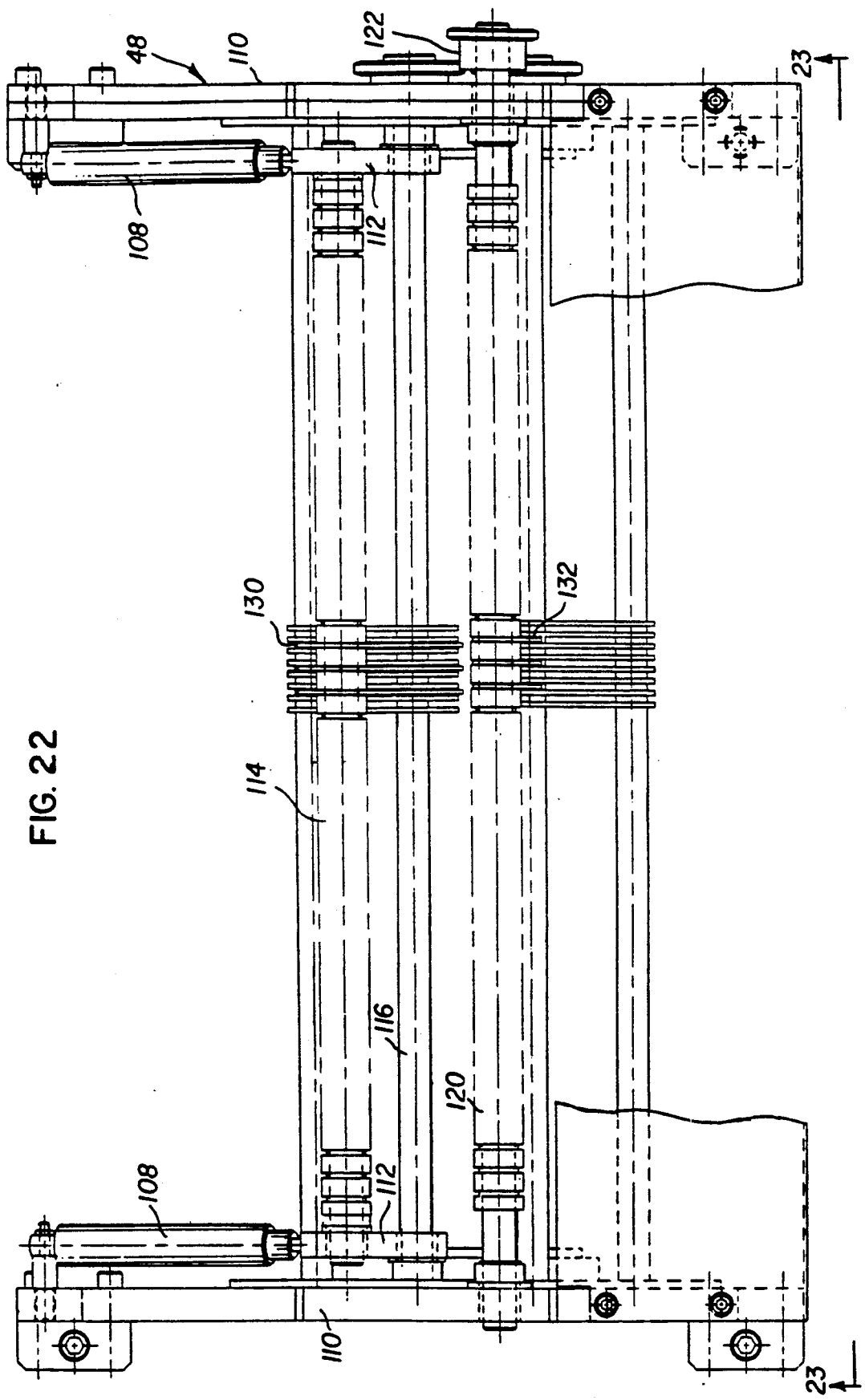
FIG. 22 is a top plan, fragmentary view of a peeler assembly according to the invention.

Peeler 48 operates as follows starting from its standby configuration with pinch roller shafts 114 and 20 closed. The actuator pistons of cylinders 108 are retracted, causing each pivot arm 112 to rotate about fixed pivot shaft 116 with guide shaft 138 following and causing feed plate 130 to rotate, shifting movable shaft 114 away from drive shaft 120 to the open position illustrated in FIG. 21. Robot 10 in response to operating signals from programmable controller 42 moves gripper 30 to the position shown in FIG. 5, in which lifted portions 102 of release sheet 18 are positioned between movable shaft 114 and drive shaft 120, with lifted portions 102 approximately parallel to the axes of rotation of drive shaft 120 and movable shaft 114, as shown in FIG. 21. Cylinders 108 are then actuated to extend their actuator pistons, causing movable shaft 114 to pivot and axially contact drive shaft 120. As a result, lifted portions 102 are grasped between the two shafts, as illustrated in FIG. 25. The drive means is then actuated to rotate drive sprocket 122 and drive shaft 120. The direction of rotation of drive shaft 120 is selected so that release sheet 18 is peeled away from foam pad 12 as robot 10 moves foam pad 12 transversely above the two shafts. The independent rotation of drive shaft 120 and dependent opposite rotation of movable shaft 114 cause grasped release sheet 18 to be pulled and driven between movable shaft 114 and drive shaft 120 and away from foam pad 12, exposing adhesive-coated layer 16. As release sheet 18 is driven between shafts 114 and 120, robot 10 moves foam pad 12 horizontally in the direction shown by the direction arrow in FIG. 5 at a speed sufficient to result in removing release sheet 18 with substantially no tearing of release sheet 18 and substantially no bending of foam pad 12. One skilled in the art can determine the speed at which foam pad 12 should be moved during the above-described release sheet removal for the selected operating parameters, such as the speed of drive shaft 120, the force of adhesion of release sheet 18 to foam pad 12, and so forth. It is preferred that foam pad 12 be moved at a speed at least equal to the speed at which release sheet 18 is drawn through the pinch rollers and in the direction approximately perpendicular to the direction of removal of release sheet 18.

As release sheet 18 is drawn between movable shaft 114 and drive shaft 120, feed plates 130 and 132 guide release sheet 18 into shredder head 118. In the specific embodiment described herein, release sheet 18 is completely removed from foam pad 12. In an alternate embodiment, release sheet 18 can be partially removed from foam pad 12 and foam pad 12 utilized with such configuration, or with the partially removed part of release sheet 18 further being cut and partially or completely removed from release sheet 18. Such could be the case, for example, should it be desired to first utilize just the partially exposed adhesive on foam pad 12 and either leave the rest of release sheet 18 on foam pad 12 or remove some or all of it subsequently.

Figure 6:
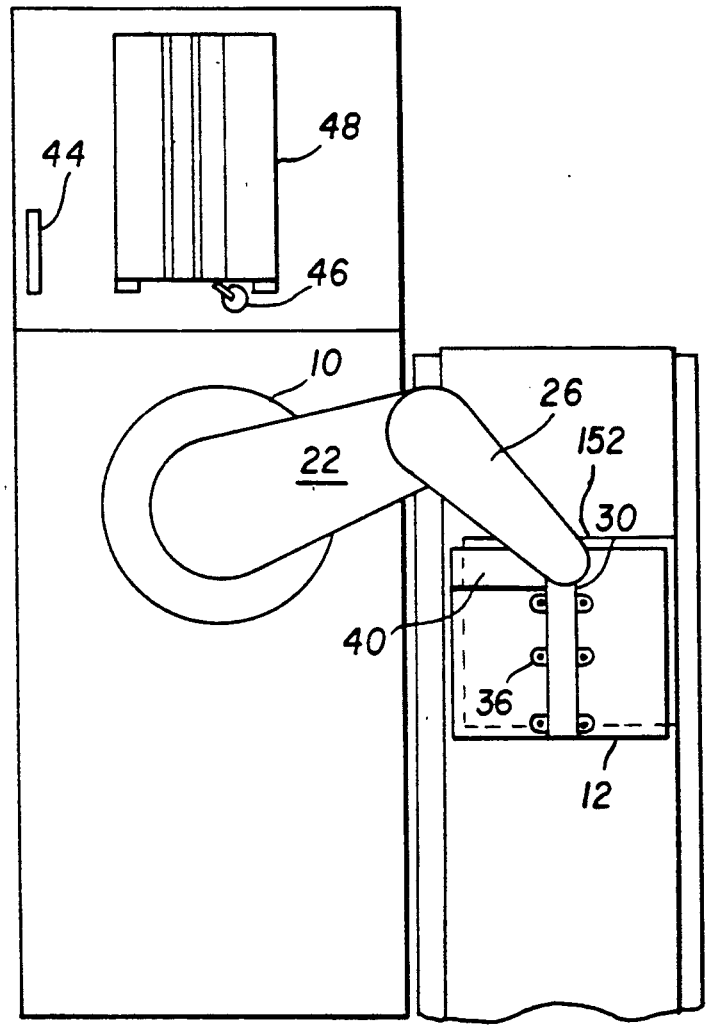
FIG. 6 is a fragmentary plan view of the apparatus of FIG. 1 as configured when a foam pad, having an exposed adhesive-coated layer is gripped by the robot gripper and positioned to affix a second workpiece to the exposed adhesive.
Figure 7:
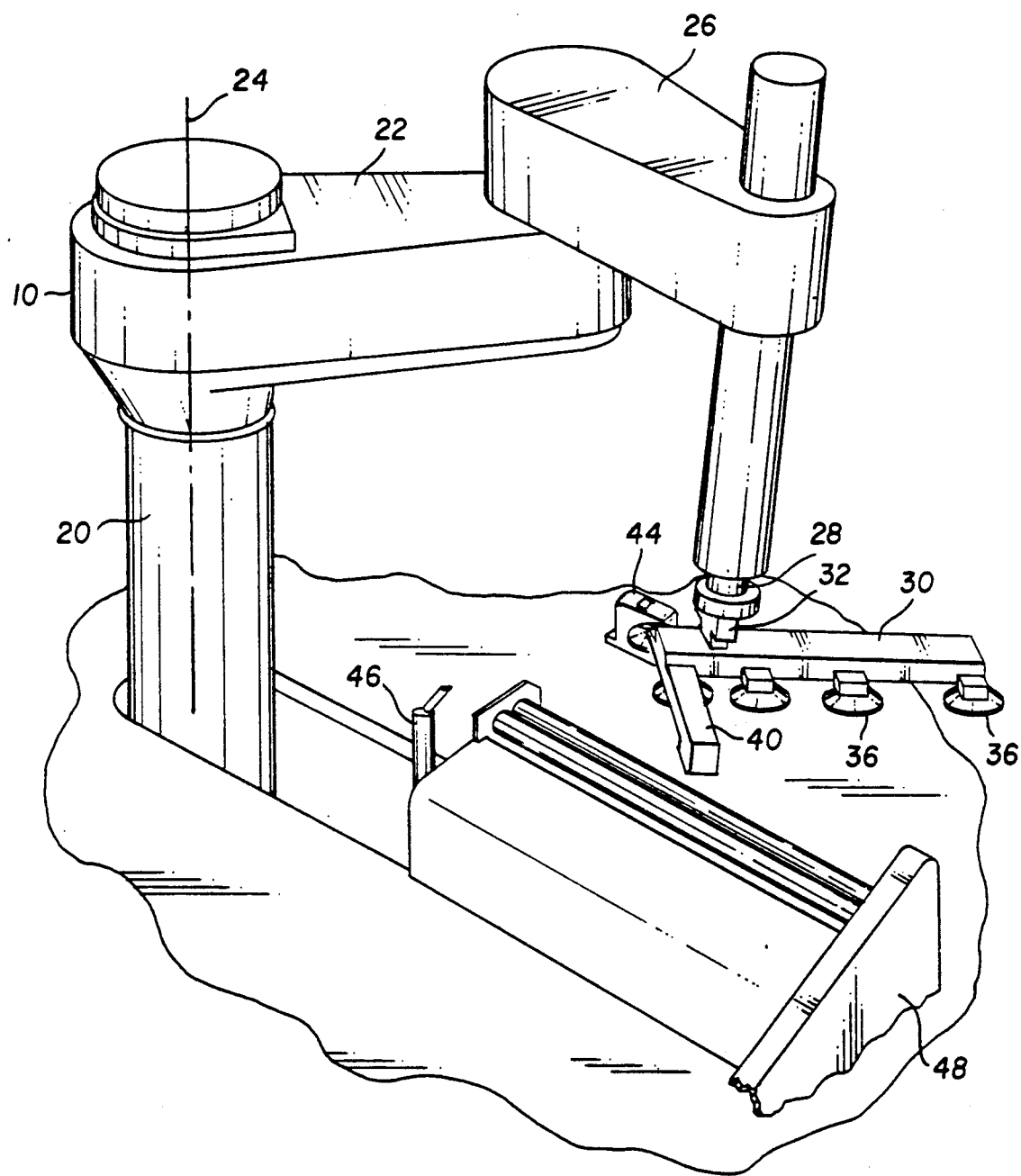
FIG. 7 is a perspective view of the apparatus of FIG. 1.

After removal of release sheet 18 and exposure of adhesive-coated layer 16, robot 10 in response to operating signals from programmable controller 42 moves foam pad 12 having exposed adhesive-coated layer 16 to the position of FIG. 6 and presses foam pad 12 onto workpiece 152 having a substantially flat upper surface. Workpiece 152 adheres to foam pad 12 by means of exposed adhesive-coated layer 16. The just described process can be further practiced on remaining release sheet 18 on foam pad 12 to affix a second laminate or other workpiece to the other side of foam pad 12.

Other operations may also be included in the practice of the invention. For example, after initially picking up a workpiece, robot 10 may position the workpiece relative to a conventional workpiece alignment means to assure that the workpiece is positioned properly relative to robot 10. Redimensioning the workpiece by trimming or other means is another operation that could be included.

The present invention can be advantageously employed in manufacturing processes in which it is necessary to remove a covering sheet from a workpiece. It provides very significant benefits. For example, it eliminates costly, inefficient, and fatiguing manual steps used in many such processes. It also permits the use of smooth-textured covering sheets that facilitate storing and handling of the workpieces. It can be effective with a release sheet having a smooth outer surface because it does not rely on adhesive means to remove the release sheet. Furthermore, the invention cleanly removes a covering sheet from a workpiece without undesirably cutting and removing other layers from the workpiece.

The invention has been described in detail with particular reference to certain preferred embodiments thereof, but it will be understood that variations and modifications can be effected within the spirit and scope of the invention.

What is claimed is:

1. An apparatus for at least partially removing from a workpiece a sheet adhered to a surface of such a workpiece, comprising:
   a knife having a cutting edge,
   means for holding said knife,
   means for gripping such workpiece and moving such workpiece so that such sheet engages said cutting edge and such workpiece is moved relative to said knife to at least partially cut such sheet and thereby form a slit therethrough, such slit comprising a first edge and a second edge;
   means for entering such slit and engaging one of such edges while said means for gripping and moving such workpiece moves such workpiece relative to said means for entering and engaging to thereby lift at least a portion of such sheet from such workpiece along such slit; and
   means for grasping such portion and at least partially removing such sheet from such workpiece.

2. The apparatus of claim 1, wherein said means for gripping and moving such workpiece comprises a programmable robot having a gripper means for gripping such workpiece.

3. The apparatus of claim 1, wherein said means for entering and engaging comprises a substantially nonflexible rod.

4. The apparatus of claim 3, wherein said substantially nonflexible rod comprises a needle having a cylindrical top surface.

5. The apparatus of claim 1, wherein said knife has a curved cutting edge for forming a lip along each of such first and second edges.

6. The apparatus of claim 1, wherein said knife cuts into such sheet near a corner of such sheet.

7. The apparatus of claim 1, wherein said knife cuts into such sheet near an edge of such sheet.

8. The apparatus of claim 1, wherein said knife is positioned relative to said means for holding so that said cutting edge is exposed by a distance from said means for holding preselected to be substantially the same as the thickness of such sheet, such sheet having a substantially uniform thickness.

9. The apparatus of claim 1, wherein said means for grasping and removing comprises
   drive means comprising a pair of pinch rollers, each pinch roller having a drive surface thereon, for grasping a lifted portion of such sheet and driving such sheet therebetween; and
   a plurality of plate means rotatably mounted on each said pinch roller for guiding such sheet away from said drive means.

10. The apparatus of claim 9, further comprising a shredder.

11. The apparatus of claim 1, wherein said means for grasping and removing comprises:
    a housing;
    a movable shaft having a resilient surface thereon having therein a plurality of axial, circumferentially extending grooves spaced apart;
    a drive shaft, having a resilient surface thereon having therein a plurality of axial, circumferentially extending grooves spaced apart, said drive shaft being opposed to said movable shaft;
    means for pivoting said movable shaft into axial contact with said drive shaft;
    a first plurality of feed plates loosely and rotatably mounted on said movable shaft;
    a second plurality of feed plates loosely and rotatably mounted on said drive shaft; and
    means for rotating said drive shaft.

12. The apparatus of claim 11, wherein:
    each of said first plurality of feed plates has a first bore therein by which each feed plate of said first plurality is loosely and rotatably mounted in one of said circumferentially extending grooves of said movable shaft;
    each of said second plurality of feed plates has a first bore therein by which each feed plate of said second plurality is loosely and rotatably mounted in one of said circumferentially extending grooves of said drive shaft;
    whereby when said movable shaft is pivoted toward such axial contact with said drive shaft, each feed plate on each of said movable and drive shafts is contacted by the opposing shaft or one of the plates on the opposing shaft, so that said feed plates retract into their respective circumferentially extending grooves to allow said resilient surface on said movable shaft to axially contact said resilient surface on said drive shaft.

13. The apparatus of claim 11, further comprising a shredder.

14. The apparatus of claim 11, wherein said means for pivoting comprises an adjustable pneumatic cylinder.

15. A method for at least partially removing from a workpiece a sheet adhered to a surface of such a workpiece, comprising:
    at least partially cutting such sheet and thereby forming a slit therethrough such slit comprising a first edge and a second edge;
    providing a substantially nonflexible rod;
    entering such slit and engaging one of such edges with said rod by moving such workpiece relative to said rod, thereby lifting at least a portion of such sheet from such workpiece along such slit;
    providing a pair of pinch rollers, each pinch roller having a drive surface thereon, for grasping a lifted portion of such sheet and driving such sheet therebetween;
    providing a plurality of plate means for guiding such sheet away from said pinch rollers;
    rotatably mounting said plurality of plate means on said pinch rollers;
    positioning said lifted portion between said pinch rollers; p1 axially contacting said pinch rollers to grasp said lifted portion; and
    pulling said lifted portion at least partially away from such workpiece, by rotating said pinch rollers toward one another to remove such sheet from such workpiece and drive such sheet between said plate means while moving such workpiece transverse to the direction of said pulling.

* * * * *